Aug. 8, 1939.  C. S. SCHROEDER  2,169,167
WHEEL MOUNTING
Filed April 27, 1937  3 Sheets-Sheet 1
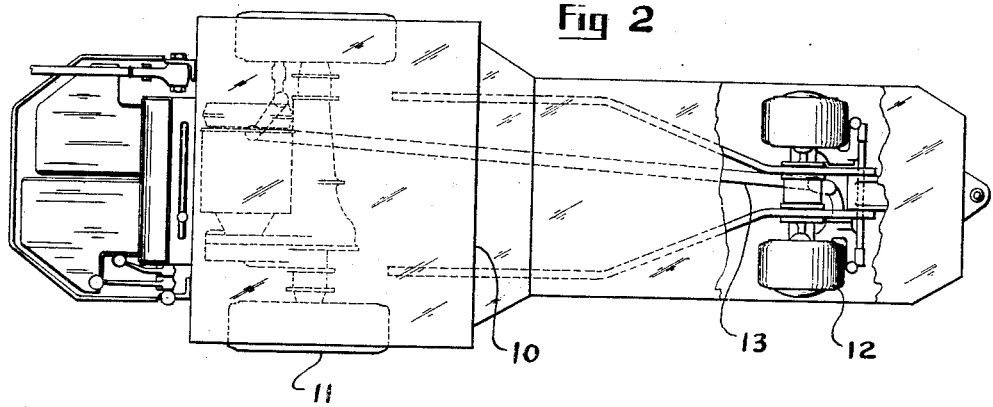
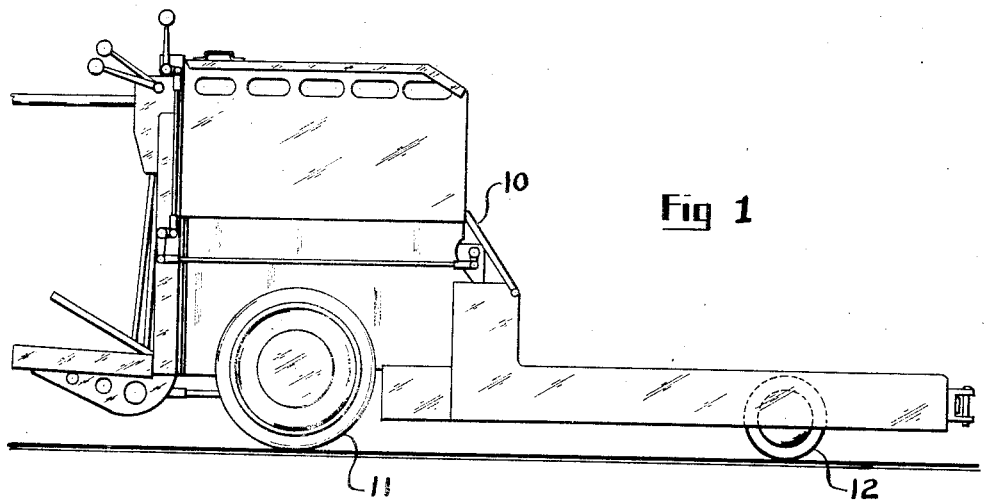
INVENTOR
C. S. Schroeder
BY
A. H. Golden
ATTORNEY Aug. 8, 1939.   C. S. SCHROEDER   2,169,167
WHEEL MOUNTING Filed April 27, 1937   3 Sheets-Sheet 3

INVENTOR
C. S. Schroeder
BY
A. H. Golden
ATTORNEY

Patented Aug. 8, 1939

2,169,167

UNITED STATES PATENT OFFICE 2,169,167

WHEEL MOUNTING

Charles S. Schroeder, Philadelphia, Pa., assignor to The Yale & Towne Manufacturing Company, Stamford, Conn., a corporation of Connecticut Application April 27, 1937, Serial No. 139,117

7 Claims. (Cl. 301—5)

This invention relates to the mounting of wheels on an industrial truck.

Industrial trucks carry extremely heavy loads and receive extremely harsh treatment. They move about in narrow corridors and are subjected to frequent bumps against immovable and relatively immovable objects. It will be readily appreciated that the wheels of a truck of this type must be of special construction in order to withstand the gruelling service to which they are subjected.

The wheel mounting of my invention is so devised that the wheel per se is extremely strong, and is constructed to protect the axle and bearing relatively to which it is mounted. The wheel is also of such a character as to support properly the usual type of industrial solid rubber tire.

An additional feature of extreme value in my wheel mounting is the relation of the wheel to the bearing carried by the axle. My wheel is arranged so that it is secured directly to the outer race of the bearing, the bearing being secured on the axle and being itself a sealed unit adapted to be mounted as a unit on the axle. Because of this construction, when the tire carried by the wheel is worn, the wheel may be removed as a whole, leaving the bearing in place so that the bearing need not be disturbed. The wheel may, when a new tire is placed thereon, be reassembled to the bearing without the bearing requiring any adjustment whatsoever.

There are additional features of my invention which are exceedingly important, and which will be set forth in detail in the description of my invention which follows. It should be understood that I believe my contribution to the art to be extremely valuable, and that I do not wish to be limited in the scope of the monopoly to be granted me except as may be required by the state of the art.

Figure 3:
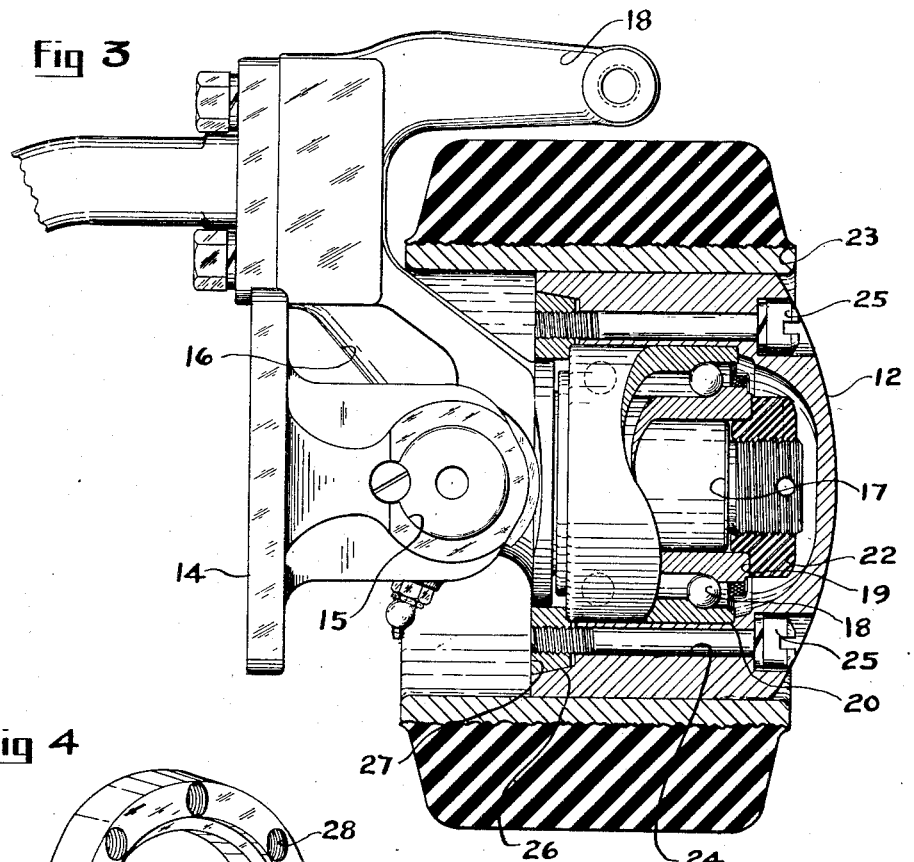
Figure 4:
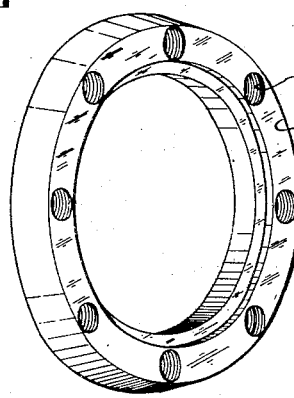
Figure 5:
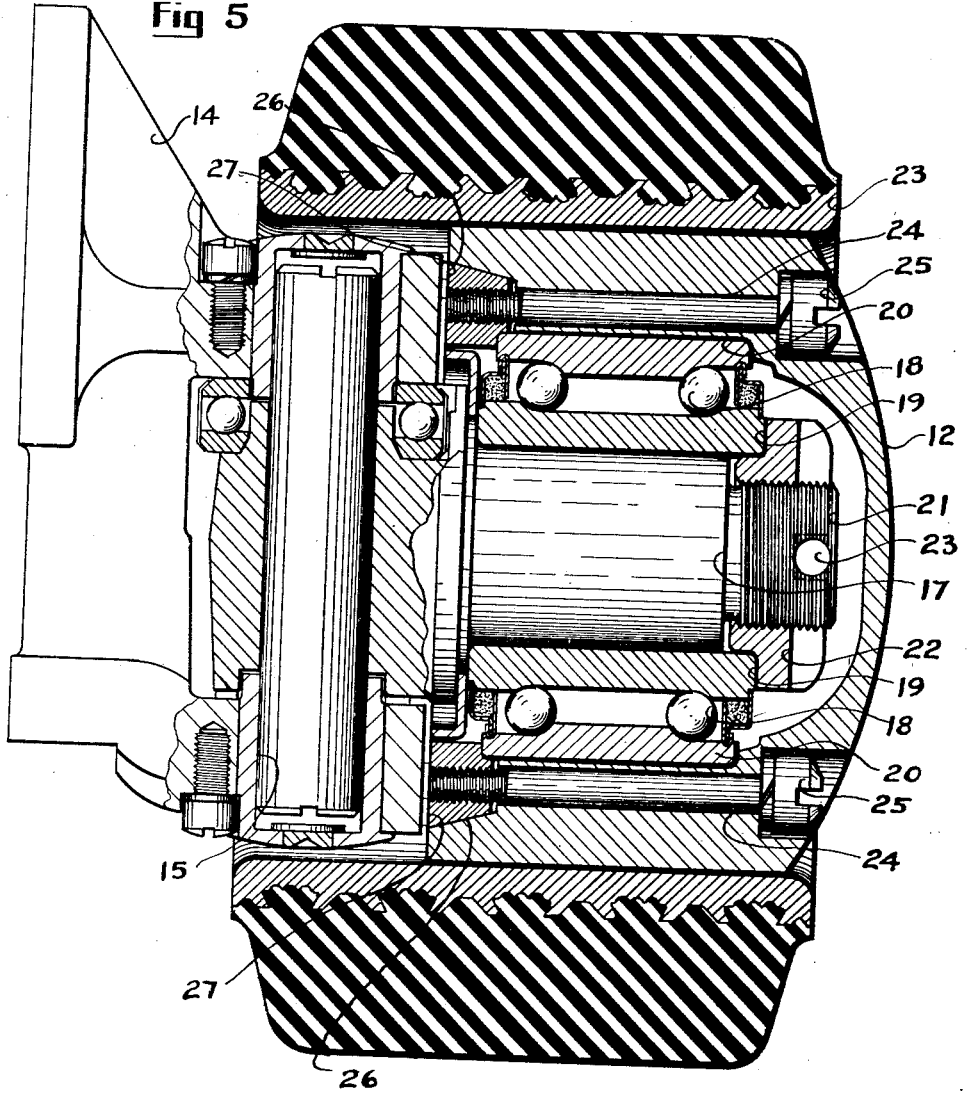

Referring now to the drawings in which a preferred embodiment of my invention is shown, Fig. 1 is an elevation of a typical industrial truck, while Fig. 2 is a plan view of the truck of Fig. 1 showing a forward steering wheel mounting utilizing my invention. Fig. 3 is a plan view and partial section of my wheel mounting. Fig. 4 is a perspective view of a wedge ring used in my invention. Fig. 5 is a vertical section through a wheel mounting illustrating some of the parts not entirely shown in Fig. 3.

Referring now more particularly to the drawings and especially to Figs. 1 and 2, reference numeral 10 represents a typical industrial truck having driving wheels 11 and forward steering wheels 12, the steering wheels 12 being steered by a rod 13 extending from the wheels to the rear or platform end of the truck. This construction is usual in the art and need not be explained in any further detail.

Referring now to Figs. 3, 4 and 5, a part of the frame of the truck is designated by reference numeral 14, and represents a steering pin supporting bracket. In this bracket, there is supported a steering king pin 15 carrying the steering arm 16 which is integral with the stub axle 17. The steering arm 16 is connected to a link arm 18 which is operated by the steering rod 13 shown in Fig. 2. The construction and mounting of the steering arm 16 relatively to the bracket 14 of the frame and the king pin 15 supported thereon, is of a type covered in a copending application, now Patent Number 2,110,425 and is therefore not described in any further detail here.

The stub axle 17 is adapted to carry a bearing 18, which in this case is shown to be of the ball bearing type. This bearing has an inner race 19 and an outer race 20, the said inner and outer races being held assembled one relatively to the other, so that the bearing 18 may as a unit be mounted on the stub axle 17. Because of the nature of the construction of my wheel mounting, the fit between the inner race 19 and the stub axle 17 is a drive fit, it being unnecessary to remove the bearing 18 from the stub axle 17 at any time after it is driven on the axle 17, except perhaps in case of the failure of the bearing. It should be indicated at this time that the bearing is of the sealed type in which grease is inserted therein at the time of manufacture and assembly, so that it never requires any attention. It is for that reason that it will be noted that no means are present for supplying lubricant to the bearing 18.

The stub axle 17 is threaded as at 21 and mounted on the threads is a nut 22, drilled at 23 for a cotter pin and shouldered so as to fit against the outer end surface of the inner race 19 whereby to maintain the bearing in position on the stub axle.

The wheel 12 of my invention is of an extremely unique type. This wheel is in the form of a circular drum having rim and hub portions formed integrally, as is well shown in Fig. 5. Its rim portion is quite heavy, so that it may support thereon the tire 23. At this time, it may be well to indicate that the tire 23 is of the standard commercial type supplied to the industry, and comprises a rim portion which is secured integrally to a rubber portion by the molding of the rubber about the rim.

The wheel 12 is drilled and countersunk at several circumferentially spaced points 24. A bolt 25 is fitted into each of these drilled and countersunk portions and extends entirely through the rim portion of the wheel 12, as is shown in Figs. 3 and 5. The inner end surface of the rim portion of the wheel 12 is tapered as at 26 for cooperaton with the wedge surface of a wedge ring 27 which fits against the outer race 20 of the bearing 18 and is drilled and tapped at several points 28 for cooperation with the threaded ends of the bolts 25. The manner in which the wedge ring 27 cooperates with the outer race 20 and the wheel 12 and bolts 25 will be readily appreciated by those skilled in the art from viewing the drawings. When each of the bolts 25 is properly secured to the wedge ring 27, the wedge ring acts to hold the wheel assembled to the outer race, it being very simple thereafter to remove the wheel 12 from the outer race by withdrawing the bolts 25 from the wedge ring 27.

Because of the particular construction which I have devised, it is readily appreciated that my wheel 12 has a very heavy rim portion which is well adapted to support the tire 23. It is also well to note that the hub portion of the wheel 12 integral with the rim portion of the wheel 12 is so positioned that it protects completely the stub axle 17 and the bearing 18 which supports the wheel. It is also well appreciated that the wheel is readily assembled to the outer race 20 of the bearing 18 and that it is readily dissembled from the outer race 20 so that the wheel may be readily removed from the axle. Because of this particular construction, it is quite simple to remove the wheel for the applying of a new tire thereto without requiring the resetting of the bearing or the handling of the bearing in any way. Since tires are changed in industrial establishments where the men are not skilled in the assembly of truck wheels, or the handling of the truck wheel bearings, the advantages of this particular feature will immediately be appreciated.

It should also be noted a this time that actually, my wheel assembly comprises but a minimum of parts. I use an inner race secured to the axle itself, and an outer race to which is applied the wheel. It is only through the outer race that the wheel is secured to the assembly. In addition, there is but on element, that is the tire, which is slipped directly onto the wheel portion which is secured to the outer race. I utilize therefore nothing more than a tire, a wheel, and a bearing having inner and outer races, for the forming of my complete wheel assembly.

I now claim:

1. In a combination of the class described, an axle, a bearing having an inner and an outer race, means for securing the said bearing on said axle, a wheel supported on said outer race, a tire carrying rim on said wheel, a series of bolts carried by said wheel and extending from the outside thereof inwardly and parallel to said axle, and means carried by the inner end surface of the bearing outer race cooperating with said bolts to secure said wheel and said means to said outer race.

2. In a combination of the class described, an axle, a bearing having an inner and an outer race, means for securing the said bearing on said axle, a wheel supported on said outer race, a wedge ring fitted against the inner end surface of said wheel and also against said bearing race, and screw threaded bolts securing said wheel to said wedge ring with the outer bearing race therebetween, whereby said wheel is secured to said outer bearing race for movement therewith.

3. In a combination of the class described, a stub axle, a sleeve bearing having inner and outer races, the said bearing being secured to said axle with the outer race rolling freely about the inner race, a one piece wheel fitted directly on said outer race and having a wedge like surface on its inner end, said wheel having a series of holes extending therethrough from the outside surface to the inside surface of said wheel and parallel to the stub axle, a surface of said wheel fitting against the outer end surface of said outer race, a ring secured against the inside end surface of said outer race and having a wedge like surface cooperating with the wedge like surface of the inner end of said wheel, and a series of bolts traversing the said holes in the wheel and secured to said ring whereby to pull said ring and wheel wedge like cooperating surfaces together and thereby secure the wheel against movement endwise relatively to said outer bearing race.

4. A wheel of the class described formed of a cup-shaped casting with the sides of the cup acting as a sleeve with its inner surface fitting about a bearing, the bottom of the cup acting as a hub cap for the wheel, a tire carrying rim driven over the outer surface of the sleeve of said cup shaped casting, a series of holes drilled through said hub cap portion and sleeve parallel to the axis of rotation of said wheel on said bearing, bolts traversing said holes, and means whereby said wheel is secured to said bearing by said bolts.

5. In a combination of the class described, a stub axle, a sleeve bearing having inner and outer races, the said bearing being secured to said axle with the outer race rolling freely about the inner race, a wheel having a sleeve-like portion the inner surface of which fits over said outer race, said sleeve-like portion having a series of circularly spaced holes extending entirely therethrough and parallel to the axis of rotation of said wheel, a ring fitting against the inside end surface of said outer race, cooperating wedge surfaces on said ring and said sleeve-like portion of said wheel, and a series of bolts in said holes adapted to pull said wheel and ring together with said wedge surfaces in contact whereby to secure said wheel to said outer bearing race.

6. In a combination of the class described, a bearing having inner and outer races, a one-piece wheel formed of a cup shaped casting with the inside surface of the sides of the cup fitted over the outer race of said bearing, the bottom of the cup acting as a hub cap for the wheel, said wheel having a series of bores formed through the sides of the cup parallel to the axis of rotation of said wheel and terminating in a counter bore in the bottom of the cup or the hub cap of the wheel, a series of bolts having headed ends in said counter bores and their shaft portions extending through said bores, and a ring having a series of screw threaded bores cooperable with said bolts for securing said wheel to the outer race of said bearing.

7. In a combination of the class described, a bearing having inner and outer races, a one-a series of screw threaded bores cooperable with the inside surface of the sides of the cup fitted over the outer race of said bearing, a tire supporting rim forced over the outer surface of the sides of said cup shaped casting, the bottom of the cup acting as a hub cap for the wheel, said wheel having a series of bores formed through the sides of the cup parallel to the axis of rotation of said wheel and terminating in a counter bore in the bottom of the cup or the hub cap of the wheel, a series of bolts having headed ends in said counter bores and their shaft portions extending through said bores, and a ring having a series of screw threaded bores cooperable with said bolts for securing said wheel to the outer race of said bearing.

CHARLES S. SCHROEDER.